July 4, 1933.  H. L. FERRIS  1,916,972
STALL FRONT
Filed March 1, 1930
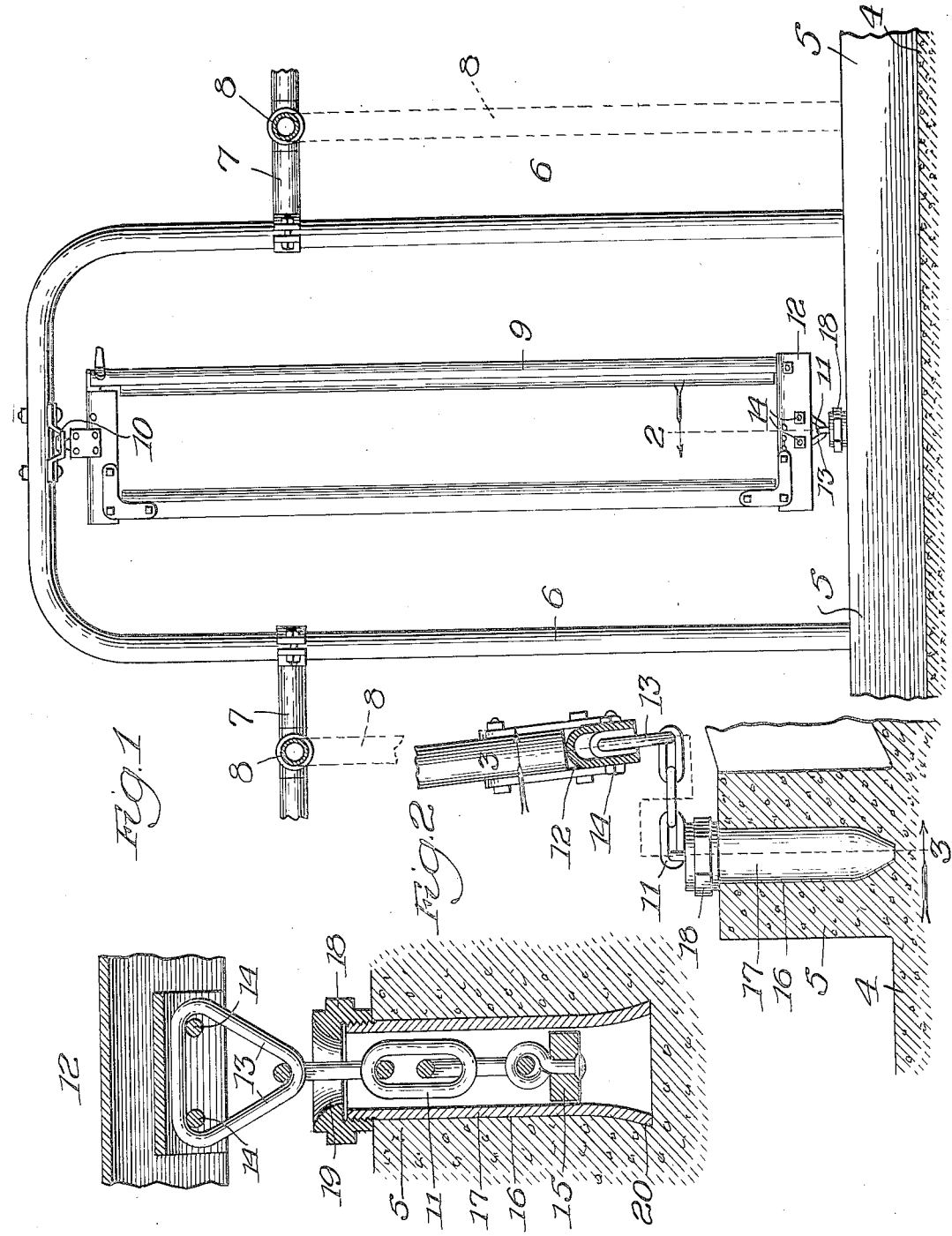

Patented July 4, 1933

1,916,972

UNITED STATES PATENT OFFICE

HENRY L. FERRIS, OF HARVARD, ILLINOIS; HOWARD J. FERRIS AND EUGENE C. FERRIS, EXECUTORS OF SAID HENRY L. FERRIS, DECEASED, ASSIGNORS TO STARLINE, INC., OF HARVARD, ILLINOIS, A CORPORATION OF ILLINOIS

STALL FRONT

Application filed March 1, 1930. Serial No. 432,493.

My invention relates to improvements in stall fronts of the type employing a stanchion preferably supported in a manner to rotate upon its support.

My object is to provide improvements in such structures to the end that the throat of the stanchion may extend in the desired position to close to the floor of the barn and still permit of the desired freedom of movement of the stanchion at its lower end within the desired limits and without danger of the restraining means at the bottom of the stanchion becoming tangled.

Another object is to avoid the tangling of such restraining means in a structure in which the stanchion is free to rotate on its support.

Another object is to provide for the ready removal of the restraining means for the purpose of repair or replacement; and other objects as will be manifest from the following description.

Referring to the accompanying drawing:

Figure 1 is a view in elevation of a section of a stall front embodying my improvement, the stall-separating partitions adjacent the stanchion shown, being sectioned.

Figure 2 is an enlarged broken section taken at the line 2 on Fig. 1 and viewed in the direction of the arrow; and Figure 3, an enlarged broken sectional view taken at the irregular line 3—3 on Fig. 2 and viewed in the direction of the arrows.

The particular illustrated embodiment of my invention comprises a floor which is represented at 4 and is preferably of concrete and comprises a curb section 5 in accordance with common construction.

In the curb 5 of the floor are yoke-shaped stall frames, one only of which is shown at 6, these stall frames in accordance with common practice being arranged in spaced apart relation along the curb 5 and connected together through the medium of cross bars 7 to which the stall separating partitions 8 are secured.

Each stall frame 6 has associated with it a stanchion represented at 9 shown as pivotally connected at 10 to the upper cross bar of the frame 6 to permit the stanchion to rotate about a substantially vertical axis, the pivotal connection 10 being sufficiently loose to permit of the swinging of the stanchion 9 thereon in accordance with common practice.

The lower portion of the stanchion 9 is provided with means, in accordance with my invention, for limiting the swinging movement of the lower end of the stanchion when occupied by an animal, these means comprising a section of chain 11 connected at its upper end with the lower hollow cross bar 12 of the stanchion 9, through the medium of a clevis 13 looped through the upper link of the chain 11 and held in place on the stanchion by bolts 14 passing therethrough and secured to the cross bar 12, the lower end of the chain 11 being provided with a circular block 15.

In accordance with my invention the chain element 11 depends into a socket in the floor 4 preferably in the curb 5 thereof and is free to move up and down therein within certain limits to afford to the lower end of the stanchion 9 the desired freedom of swinging movement.

In the particular construction shown the socket referred to and represented at 16 is lined with a metal tube 17 embedded in the concrete, this tube being provided at its upper end with a collar 18 screwed thereon, with its central opening 19 of a diameter less than the diameter of the block 15 thus affording a stop surface to be engaged by the block 15 for limiting the swinging of the stanchion as stated, it being understood that the block 15 will fit sufficiently loosely within the tube 17 to permit the chain to remain taut at all times. The opening 19 in the collar is preferably upwardly flaring as shown to minimize danger of tangling of the chain.

The socket lining 17 is preferably formed of a section of metal tubing with the lower end thereof pinched together to cause it to assume the shape shown in the drawing thereby presenting the laterally outwardly flaring portions 20 which serve to interlock with the concrete in which it is embedded thereby retaining the lining against accidental displacement.

It will be understood from the foregoing that as the animal positioned in the stanchion 9 moves its head back and forth and sidewise, the chain section together with the block 15 will move freely in the socket, except as restrained by the collar 18, the chain and the block remaining taut and thereby avoiding any danger of the chain becoming tangled and interfering with the desirable freedom of movement of the stanchion.

Furthermore, as the chain and block are free to rotate in the socket structure, in the rotation of the stanchion 9 upon its pivot 10, danger of tangling of the chain in such rotation is thereby prevented.

One of the particular advantages presented by my construction from a practical standpoint is that the lower, or throat, portion of the stanchion 9 may be positioned at the desired short distance above the curb 5, without danger of the chain 11 becoming tangled and interfering with the desired freedom of swinging movement of the stanchion.

Also since the point of suspension of the flexible element 13 is relatively close to the top of the socket, as best shown in Figures 1 and 3, when the stanchion is swung from the vertical, that portion of the flexible element between said point of suspension and the socket, will be substantially horizontal, as shown in Figure 2. The weight of the flexible element 11 is merely sufficient to keep the same from buckling, kinking or becoming slack.

The construction shown also lends itself to the ready removal of the chain and block and the reassembling of these parts in case of repair or substitution, by merely unscrewing the collar 18 from the position shown and the subsequent reattachment of the collar.

While I have illustrated and described a particular construction embodying my invention, I do not wish to be understoood as intending to limit it thereto as the same may be variously modified and altered without departing from the spirit of my invention.

What I claim as new, and desire to secure by Letters Patent, is:

1. In combination with a floor comprising a curb portion containing a socket, a stall front comprising a support, a stanchion, means connecting said stanchion with said support at its upper end to swing thereon and rotate about a substantially vertical axis, and means for limiting the swinging movement of said stanchion including a flexible member ending in an enlargement, said flexible member being attached at one end to the lower end of such stanchion, the enlarged free end extending into said socket and movable up and down therein, and restricting means removably attached to said socket, provided with an opening through which said flexible member passes and limiting upward movement thereof, the last mentioned means being located on the flexible member when the last mentioned means is detached and the member is displaced from the socket.

2. In combination with a floor comprising a curb portion containing a socket, a stall front comprising a support, a stanchion, flexible means connecting said stanchion at its upper end to said support, and means for limiting swinging movement of said stanchion comprising a member attached at one end to the lower end of said stanchion, and having an enlargement at its free end, said free end extending into said socket and having a limited and unrestricted up and down and rotatable movement therein, and means limiting the upward movement of said member.

3. In combination with a floor comprising a curb portion containing a socket, a lining in said socket, a stall front comprising a support, a stanchion, flexible means connecting said stanchion at its upper end to said support, and means whereby swinging movement of said stanchion is limited, comprising a member secured at one end to the lower end of said stanchion and depending therefrom and having an enlarged free end, said free end extending into said lining and movable up and down therein, and a collar removably secured to said lining and having a portion restricting the mouth of said lining whereby the collar may be rotated on said member when the collar is detached and the member displaced from the lining.

4. In combination with a floor comprising a curb portion containing a socket, a stall front comprising a support, a stanchion, means connecting said stanchion at its upper end to said support, said means adapted to permit said stanchion to swing on said support and to rotate about a substantially vertical axis, and means whereby swinging movement of said stanchion is limited, comprising a flexible member attached at one end to the lower end of said stanchion, the free end of said member being provided with a cross piece, said member and cross piece adapted to extend into said socket, means removably mounted on said socket, an opening in said means of less area than the cross section of said socket and area of the cross piece, said flexible member extending through said opening, said cross piece and restricted opening adapted to limit the upward movement of said flexible member when said means is attached to the socket and to retain said means on the flexible member when said means is displaced from the socket.

5. In combination with a floor comprising a curb portion containing a socket, a lining for said socket, a stall front comprising a support, a stanchion, means connecting said stanchion at its upper end to said support and adapted to permit said stanchion to swing thereon and to rotate about a substantially vertical axis, and means whereby swinging movement of said stanchion is limited comprising a chain having one end attached to the lower end of said stanchion and its free end extending into said socket, a cross piece on said free end of said chain, said chain and cross piece being movable up and down and rotatable in said socket, a collar having a central opening of less area than said cross piece and removably secured on the upper end of said lining, said chain being threaded through said opening.

6. In combination with an upstanding and flexibly supported stanchion, means providing a socket adjacent the base of the stanchion, a flexible element having one end secured to the base of the stanchion and its free end extending into said socket whereby it has a free up and down movement therein, and a member through which said flexible element passes removably secured to said socket, and means on said flexible element of such area as to be impassable through said member so that the member will be carried by said flexible element when the latter is displaced from the socket.

7. In combination with a floor comprising a curb portion containing a socket, a stall front comprising a support, a stanchion, means flexibly connecting said stanchion at its upper end to said support, and means for limiting swinging movement of said stanchion comprising a flexible member attached at one end to the lower end of said stanchion, its free end located in said socket, a member on said socket through which said flexible member passes permitting a limited unrestricted movement of said member, means on the free end of said flexible member coacting with said member mounted on said socket whereby upward movement of said flexible member is limited.

HENRY L. FERRIS.